(12) United States Patent
Larose et al.

(10) Patent No.: US 10,778,586 B2
(45) Date of Patent: Sep. 15, 2020

(54) SYSTEM AND METHOD FOR TRAFFIC STEERING AND ANALYSIS

(71) Applicant: SANDVINE INCORPORATED ULC, Waterloo (CA)

(72) Inventors: Kyle Mathieu Larose, Waterloo (CA); Michael Frank Marchetti, Cambridge (CA); Thomas James Crugnale, Baden (CA); David Cameron Dolson, Waterloo (CA); Michael Peter Bieniek, Richmond Hill (CA)

(73) Assignee: Sandvince Corporation, Vancouver, British Columbia (CA)

( * ) Notice: Subject to any disclaimer, the term of this patent is extended or adjusted under 35 U.S.C. 154(b) by 0 days.

(21) Appl. No.: 15/883,821

(22) Filed: Jan. 30, 2018

(65) Prior Publication Data

US 2018/0241680 A1    Aug. 23, 2018

Related U.S. Application Data

(60) Provisional application No. 62/451,986, filed on Jan. 30, 2017.

(51) Int. Cl.
*H04L 12/803* (2013.01)
*H04L 12/26* (2006.01)
(Continued)

(52) U.S. Cl.
CPC ........ *H04L 47/125* (2013.01); *H04L 41/5012* (2013.01); *H04L 43/0817* (2013.01);
(Continued)

(58) Field of Classification Search
CPC .................................................... H04L 47/125
See application file for complete search history.

(56) References Cited

U.S. PATENT DOCUMENTS 7,801,021 B1 * 9/2010 Triantafillis ........ H04L 12/4633
370/216
2015/0195197 A1    7/2015 Yong et al.
(Continued)

FOREIGN PATENT DOCUMENTS

| EP | 3013002 A1 | 4/2016 |
|---|---|---|
| WO | WO 2016/008322 A1 | 1/2016 |
| WO | WO 2016/150131 A1 | 9/2016 |

OTHER PUBLICATIONS

Office Action on corresponding EP patent application No. 18154302.6, dated Oct. 28, 2019.
(Continued)

*Primary Examiner* — Kevin M Cunningham
(74) *Attorney, Agent, or Firm* — Gowling WLG (Canada) LLP; Neil W. Henderson

(57) ABSTRACT

A system for steering network traffic to service functions in a service function chain, the system including: a processor; a data storage module; an input interface; an output interface; a classifier configured to determine a path for a data packet in the service function chain; and a forwarder configured to determine the next location to which the data packet will be sent based on the path. A method for steering network traffic to service functions in a service function chain, the method including: classifying a data packet to determine a path for a data packet in the service function chain; and forwarding the data packet to a next location to which the data packet will be sent based on the path.

17 Claims, 9 Drawing Sheets

(51) Int. Cl.
*H04L 12/721* (2013.01)
*H04L 12/725* (2013.01)
*H04L 12/715* (2013.01)
*H04L 12/24* (2006.01)
*H04L 12/701* (2013.01)
*H04L 12/741* (2013.01)

(52) U.S. Cl.
CPC .......... *H04L 43/0882* (2013.01); *H04L 43/10* (2013.01); *H04L 45/00* (2013.01); *H04L 45/306* (2013.01); *H04L 45/38* (2013.01); *H04L 45/64* (2013.01); *H04L 41/0654* (2013.01); *H04L 45/74* (2013.01)

(56) References Cited

U.S. PATENT DOCUMENTS

2015/0215172 A1* 7/2015 Kumar ................ H04L 41/5041 709/223
2016/0344565 A1 11/2016 Batz et al.
2016/0344803 A1* 11/2016 Batz .................... H04L 12/1407
2017/0026462 A1* 1/2017 Yin ...................... H04L 67/1008
2017/0257310 A1* 9/2017 Patil ...................... H04L 45/306
2017/0317936 A1* 11/2017 Swaminathan ......... H04L 47/20
2018/0139098 A1* 5/2018 Sunavala ............ H04L 41/0816

OTHER PUBLICATIONS

Extended European Search Report on corresponding EP patent application No. 18154302.6, dated Jun. 12, 2018.

Office Action on corresponding EP patent application No. 18154302.6, dated Mar. 20, 2019.

Espacenet, English translation of Abstract of WO 2016/150131 A1, Sep. 29, 2019.

* cited by examiner

SYSTEM AND METHOD FOR TRAFFIC STEERING AND ANALYSIS

FIELD

The present disclosure relates generally to a system and method for traffic steering and analysis on a network.

BACKGROUND

Network operators want to apply service functions to network traffic using commodity hardware or virtual machines. These solutions may be preferable over purpose-built hardware for a variety of reasons. Service functions provide complex capabilities such as, but not limited to:
  i. Aggregate measurements about application usage
  ii. Quality-of-service indicators
  iii. Subscriber metering and quota
  iv. Attack detection
  v. Traffic shaping and reprioritization
  vi. Firewall polices Network operators often want to deploy a quantity of functions as required, according to network demand, rather than deploying purpose-built hardware scaled for the worst case, which has been a conventional solution.

The Service Function Chaining (SFC) Architecture (see for example RFC7665) provides a model for forwarding traffic to service functions, but does not address certain problems, for example:
  i. How should failures be automatically detected?
  ii. What actions should be taken automatically when a failure is detected?
  iii. Precisely how should traffic be load-balanced to multiple equivalent functions?
  iv. How can functions automatically learn about attached forwarders?
  v. How can line-rate traffic be handled by functions that have a capacity below line rate?
  vi. How can traffic from multiple redundant network links utilize the same functions, being load-balanced in a consistent manner?
  vii. How should traffic be forwarded after the service chain is complete?

Therefore, there is a need to address at least some of these issues with a system and method for traffic steering and traffic analysis.

The above information is presented as background information only to assist with an understanding of the present disclosure. No determination has been made, and no assertion is made, as to whether any of the above might be applicable as prior art with regard to the present disclosure.

SUMMARY

According to one aspect herein, there is provided a system for steering network traffic to service functions in a service function chain, the system including: a processor; a data storage module; an input interface; an output interface; a classifier configured to determine a path for a data packet in the service function chain; and a forwarder configured to determine the next location to which the data packet will be sent based on the path.

In some cases, the system may further include a load balancer configured to co-operate with the forwarder to distribute the data packet to a selected service function module when there are more than one of that service function module.

In some cases, the system may be configured such that each path terminates by sending traffic out the output interface associated with the input interface.

In some cases, the classifier may include at least one classifier rules, each classifier rule is associated with an input interface, and each path sends the data packet out the output interface related to the input interface.

In some cases, each input interface may map the data packet to at least one classifier rule.

In some cases, if the data packet cannot be mapped to the at least one classifier rule, the data packet is sent to the output interface associated with the input interface.

In some cases, the system may further include a plurality of service function modules wherein each service function module is configured to return the data packet to the forwarder from which it is received.

In some cases, the system may include a health module configured to send health-check packets determine an operational status of at least one service function of the service function chain.

In some cases, the health-check packets may include fields to report load and utilization at the at least one service function.

According to another aspect herein, there is provided a method for steering network traffic to service functions in a service function chain, the method including: classifying a data packet to determine a path for a data packet in the service function chain; and forwarding the data packet to a next location to which the data packet will be sent based on the path.

In some cases, the method may further include load balancing the service functions.

In some cases, if the data packet cannot be classified, the data packet is sent to an output interface associated with an input interface.

In some cases, the method may include determining an operational status of at least one service function in the service function chain.

In some cases, determining the operational status may include determining a load and utilization of the at least one service function.

In some cases, if the operational status of the at least one service function is down, the data packet may be directed to an equivalent service function with an operational status of up.

In yet another aspect, there is provided a system for steering network traffic to service functions in a service function chain, the system may include: a processor configured to execute stored machine readable instruction; a data storage module configured to store data related to a data packet; an input interface configured to receive a data packet from a network; a classifier configured to receive the packet from the input interface and determine a path comprising at least one function for the data packet, wherein the function is performed by at least one of a plurality of service functions within the service function chain; a forwarder configured to determine the next function to which the data packet will be sent based on the path; a load balance configured to determine which service function will perform the next function to the data packet based at least in part on the load of each of the plurality of service functions within the service function chain; a health module configured to determine an operational status of each of the plurality of service functions within the service function chain; and an output interface configured to direct the data packet to a service function based on the load and the operational status of each of the plurality of service functions within the service function chain.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The following description, with reference to the accompanying drawings, is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding. Accordingly, it should be apparent to those skilled in the art that the following description of embodiments is provided for illustration purpose only and not for the purpose of limiting the invention as defined by the appended claims and their equivalents.

Generally, the present disclosure provides a method and system for traffic steering and traffic analysis on a computer network. The path of the packet may be determined by the system. The path may be analyzed based on the health of the service functions to be applied to the packet. Traffic steering may include routing traffic through service functions and load balancing the traffic.

Figure 1:
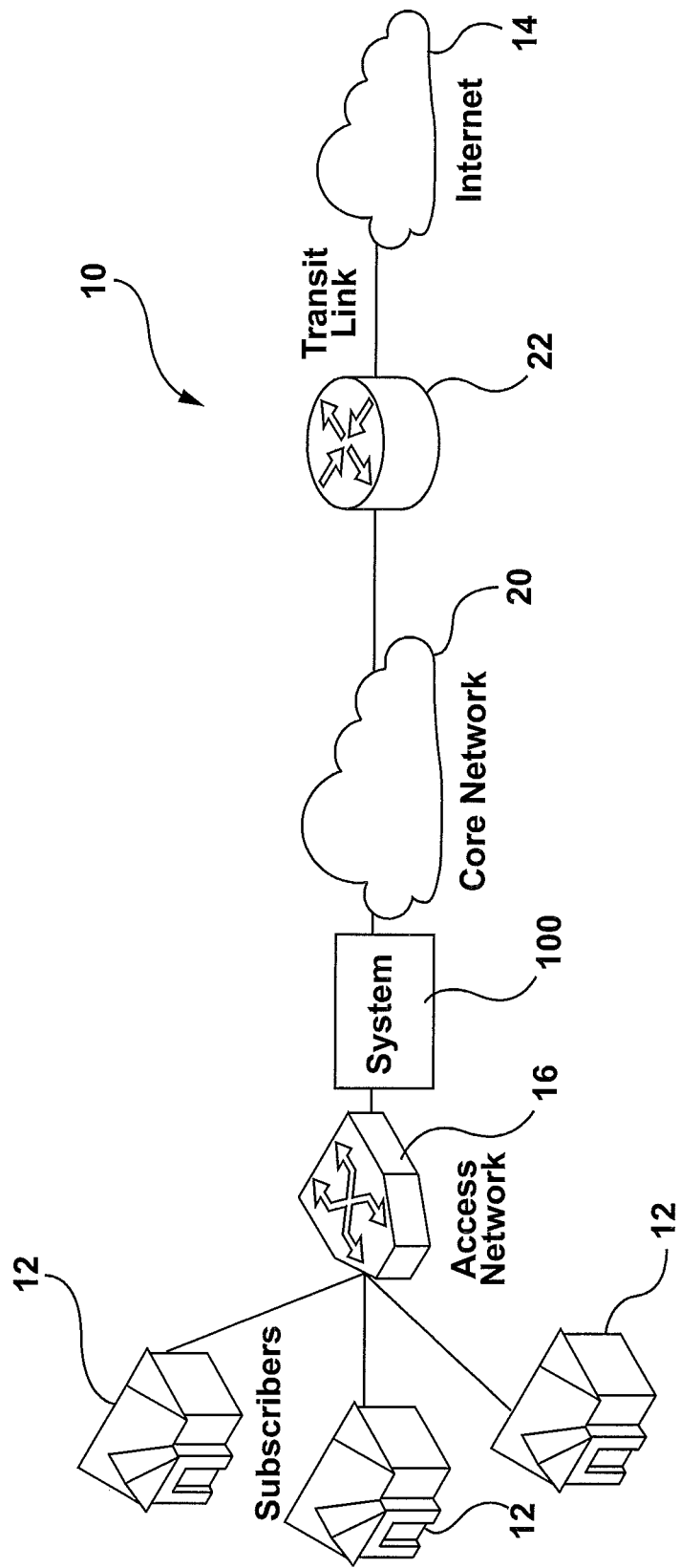
FIG. 1 illustrates an example environment for a system for traffic steering and traffic analysis.

FIG. 1 illustrates an example of a network 10. A plurality of subscribers 12 access the Internet 14 via an ISP. An Internet Service Provider (ISP) provides at least one access network 16 to the plurality of subscribers 12. The access network 16 may be a wireline access network or wireless network.

A core network 20 may connect to the Internet 14 via a transit link 22. A system for traffic steering 100 may be located between the access network 16 and core network 20 and may analysis and steer traffic through the network. It will be understood that the system may be located at other junctures. It is intended that the system be exposed to the traffic flowing through the network.

Figure 2:
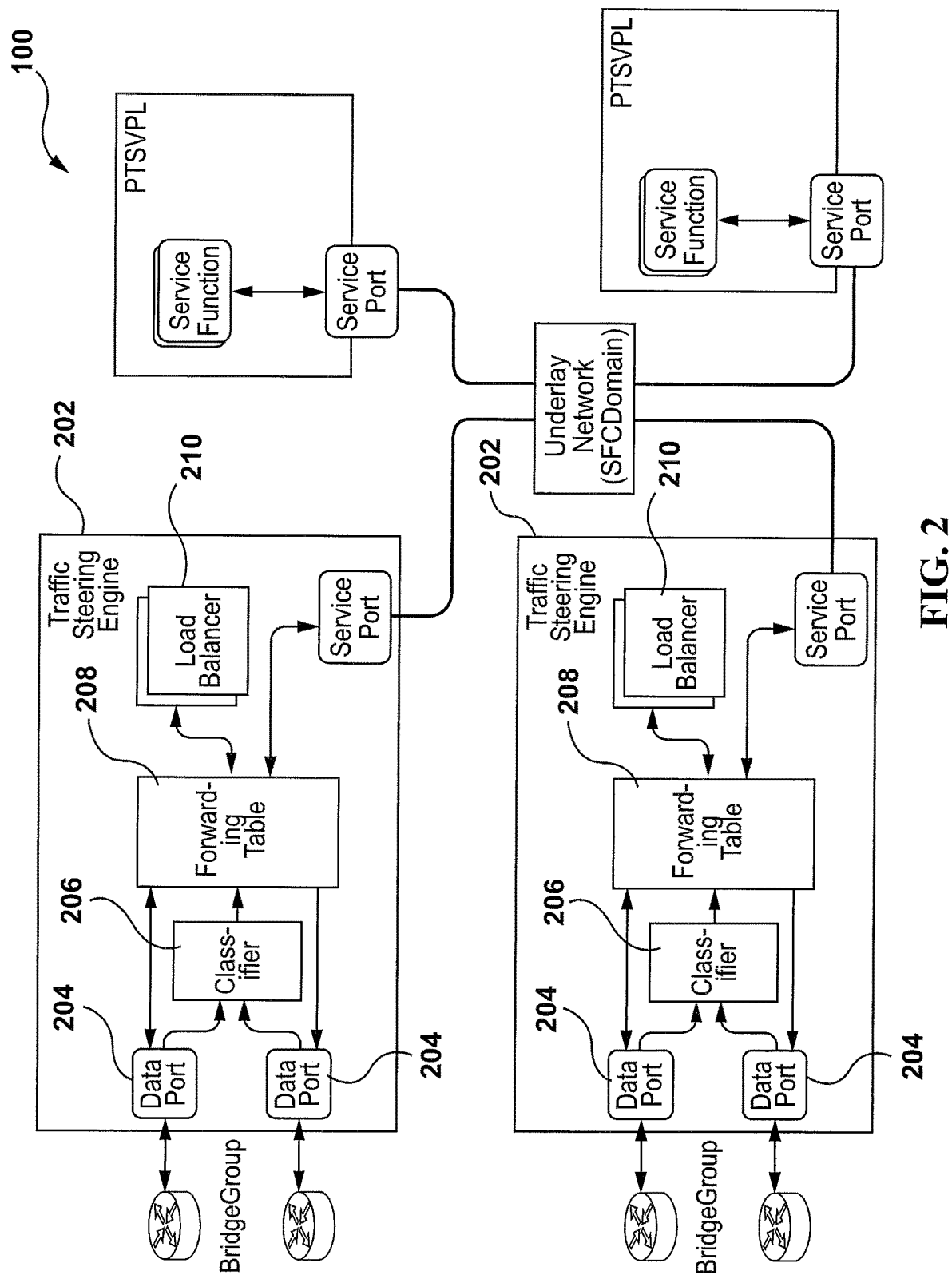
FIG. 2 illustrates a system for traffic steering according to an embodiment.

FIG. 2 illustrates components of the system 100 for traffic steering and analysis. The system 100 includes multiples components of a communications network, each having network interfaces operatively connected to functional units that may include special-purpose or generic processors configured to execute instructions stored in a memory component. The system may include at least one traffic steering engine 202. Each traffic steering engine 202 may include at least one data port 204 operatively connected to a classifier 206. The classifier and data ports may also be operatively connected to a forwarding table 208, sometimes referred to as a forwarder. The forwarding table 208 may be in communication with at least one instance of a load balancer 210. A data port may be an input interface while a service port may be an output interface according to an embodiment of the system. In some cases, a service port may both an input and output interface.

The classifier 206 is the component of the system responsible for choosing the path a packet will take. Typically, the classifier runs only once per packet, allowing for costly packet operations to be performed only once for the lifetime of the packet within the service function chain. Conventionally these operations are performed as the packet enters the system.

Since the classifier chooses the path a packet takes, it is generally the component responsible for determining:
  i. The first service function visited by the packet and
  ii. The ultimate exit point of the packet from the system.

A typical deployment will have packets exit the system by performing a routing lookup. However, the system may require that packets leave the system out a particular physical interface, determined by the input interface, without any modifications to the packet headers (aside from any incidentally made by the service functions). In particular, each interface is paired with another in a Bridge Group. When packets enter the system in the first interface of a Bridge Group, they must, or are generally required to, exit the system out the second interface of a Bridge Group, and vice versa. This behavior provides a full duplex link connecting two devices. A device intersecting a link in such a manner is known as a bump in the wire.

A major challenge in maintaining this behaviour in an SFC environment is that the identity of the input interface into the system is lost once the packet exits the classifier. When the packet reaches the final hop in the classifier, no information within the packet indicates the source of it.

In one embodiment of the system, the system includes a mechanism to surmount this challenge whereby:
  i. Each classifier rule is associated with an input interface;
  ii. The system is built such that each provisioned path terminates by sending traffic out the interface paired with the input interface;
  iii. Each interface maps its traffic to a set of classifier rules, all of which point to paths provisioned as above;
  iv. If traffic cannot be mapped, for example because the traffic does not match any rule, it is directly sent to the interface paired with the input interface;
  v. Thus, all traffic entering the system will be sent out the interface paired with the input interface, maintaining the bump-in-the-wire behaviour.

Figure 3:
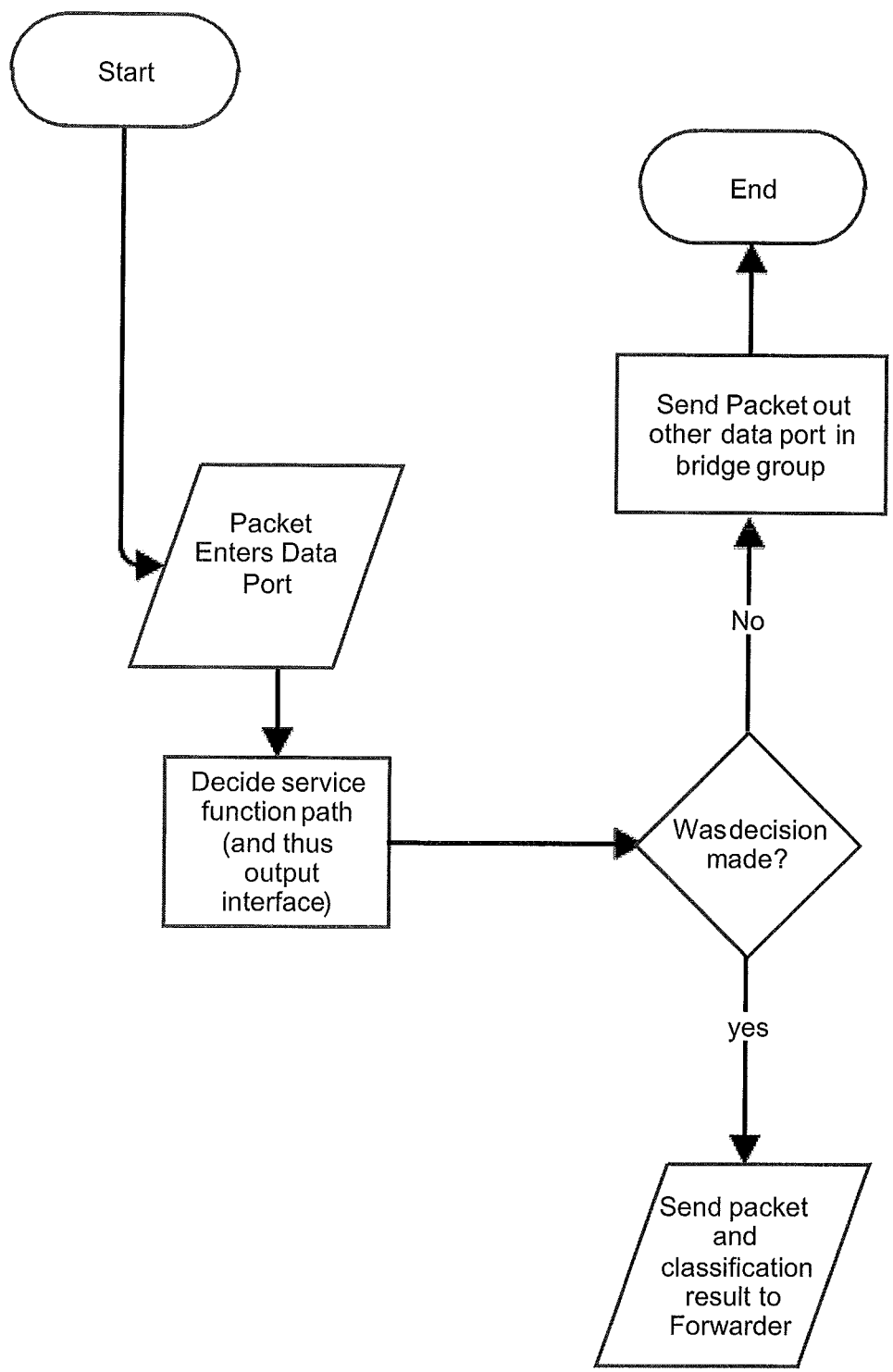
FIG. 3 is a flow chart for a traffic classification according to an embodiment.

The classifier is intended to follow three types of rules:
i. Per interface—all packets entering this interface are sent to the chosen path
ii. Per source IP address and interface—all packets entering this interface with the provided source IP address are sent to the chosen path
iii. Per destination IP address and interface—all packets entering this interface with the provided destination IP address are sent to the chosen path At the configuration level, each classifier may be associated with at least one table. The classifier tables map rules to a conceptual path, whose packet-level characteristics are not specified directly in the rule. Within the packet processing logic, however, the classifier maps directly to the packet data that would be used for a processing in the Forwarder or Forward table. This mapping is intended to allow for more efficient processing. A method used by the classifier in an embodiment of the system is shown in FIG. 3.

The forwarder is the component of the system responsible for determining the next location a packet will be sent according to its current location in the chain. It is programmed with a table indexed by service path index and service index to the next hop. In some cases the table may be prepopulated. In other cases the table may be populated from observing the service path in progress. The result of the table search identifies the next hop as one of:
i. Service function: the packet is to be sent directly to a service function for processing. The Service Function is identified with an encapsulation required to deliver the packet. (for example, the packet with path-next-hop parameters may be delivered over Ethernet or over an IP tunneling encapsulation, or over an UDP tunneling encapsulation.)
ii. Load balancer: the packet is to be sent to a load-balancing function. The load balancer will select one from several equivalent next hops.
iii. Another forwarder: the packet is to be sent to another forwarder that is better able to deliver the packet to the required service function.
iv. Terminator: the packet is to be removed from the chain and exits the system, such as being forwarded to a specific interface. This allows each path to terminate in a specific manner.
v. "skip" function: the packet is to be treated as though it were processed by a service function, with the path-hop identifier advanced to the subsequent function (for example, by incrementing the service index) and re-processed by the forwarder rules.
vi. "discard" operation: the packet is to be discarded.

A path comprises a series of entries in the forwarder which share a service path index, with each subsequent hop having a service index one less than the previous.

Input to the forwarder comes in two forms:
i. A packet and a classifier result, from the Classifier; and
ii. An SFC encapsulated packet from the service interface.

Figure 4:
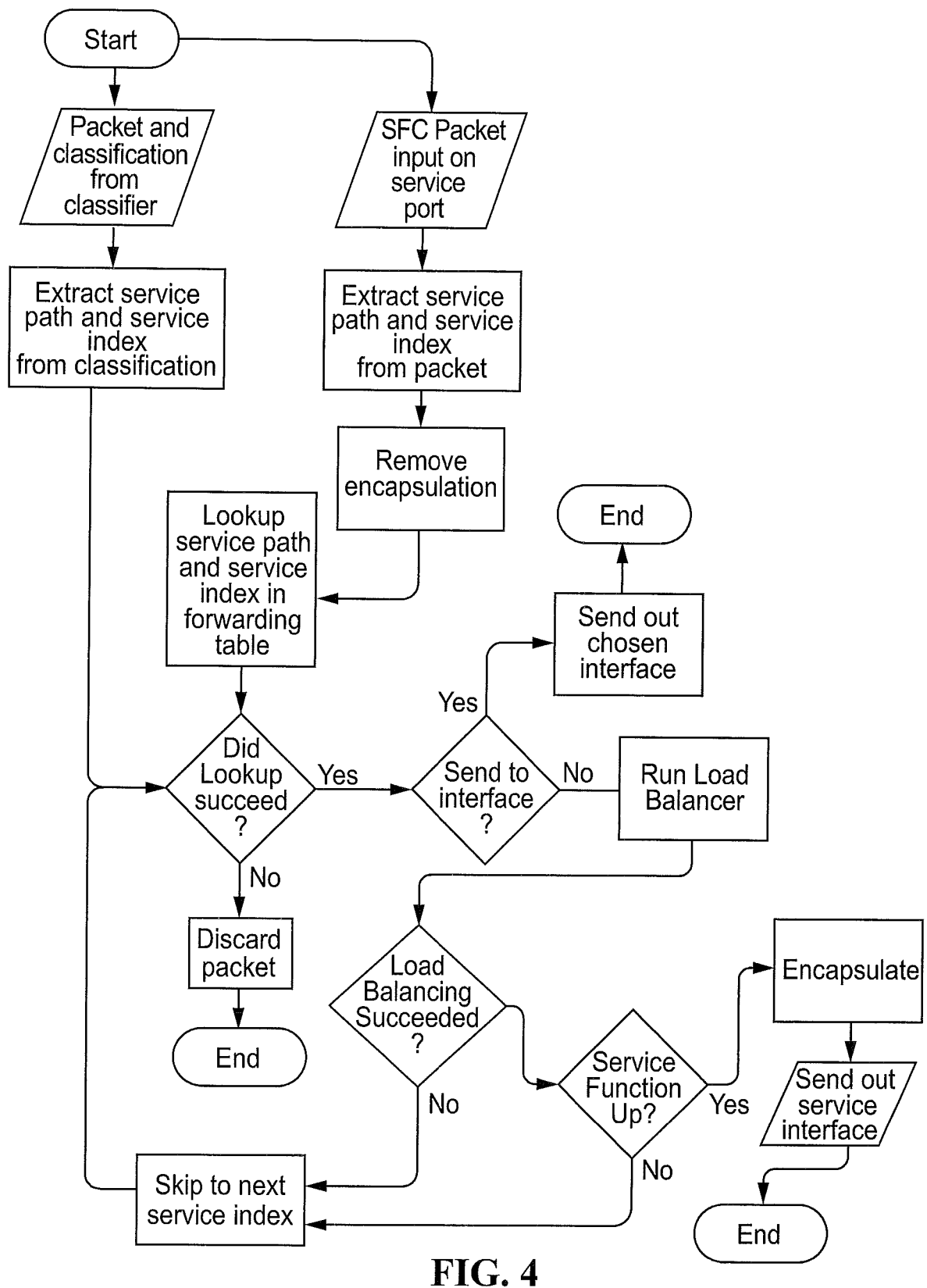
FIG. 4 is a flow chart for traffic forwarding according to an embodiment.

The forwarder takes input from the two above forms, and then translates it into a common lookup key. It uses that key to perform a lookup in the forwarding table. If the lookup fails, the packet may be discarded. If the lookup succeeds, the packet may be sent to the method for handling that particular type of result. FIG. 4 illustrate the method for handling a load balancer result, and an interface terminator result.

For load balancer results, the packet is sent to the chosen load balancer, which may choose a service function. If it chooses a service function, and the service function is up, the packet is encapsulated with the SFC encapsulation corresponding to the Service Function for the current location in the service chain, and the outer header by which the service function is addressed. The packet is then sent out the service interface.

If a service function is selected as the next-hop but the service function is not up, the forwarder may be configured to automatically apply the "skip" function instead. In this case, the service index is decremented, and the forwarding table lookup process restarts. This has the effect of "skipping" the hop on which the service function was not up, allowing the system to continue to process portions of the path which had not failed.

If the load balancer does not choose a service function, the service index is decremented, and the forwarding table process restarts. This is intended to allow for safe forwarding even when configuration is incorrect.

For interface terminator results, the packet is sent out of the chosen interface without any encapsulation.

At the configuration level, many of the concepts may be represented through multiple tables. For example, the details of the interface terminator may be stored in a table indexed by name, while the details of the load balancer may be in a table mapping the load balancer's name to its properties. The forwarding table may be programmed by providing a mapping of service path index and service index to next hop name and next hop type, thereby telling the system where to retrieve further information for a given hop.

In one example, these many tables are intended to be denormalized down into two efficient fastpath structures within the forwarder:
i. The forwarding table, indexed by service path index and service index; and
ii. The service function table, indexed by a service function id.

Other indexes may also be used. Note that the service function id is not shown in the flow chart in FIG. 4. However, in an embodiment, the load balancer would have returned the id. The forwarder may then use the id to look up the service function details in the service function table. These details would have included whether the service function was up, and how to address it.

The forwarder maintains statistics for each lookup it performs, and the resulting action. It counts, per hop, how many packets and bytes matched that hop, and other aspects such as, for example:
i. How many packets skipped to the next entry
ii. How many packets were sent to service functions
iii. How many packets were sent to interface terminators
iv. How many packets were discarded The load balancer component of the system is responsible for distributing packets to a group of devices performing the same service function. It has two parts:
i. An automatic rebalancing system; and
ii. A packet forwarding engine (fast-path)

Figure 6:
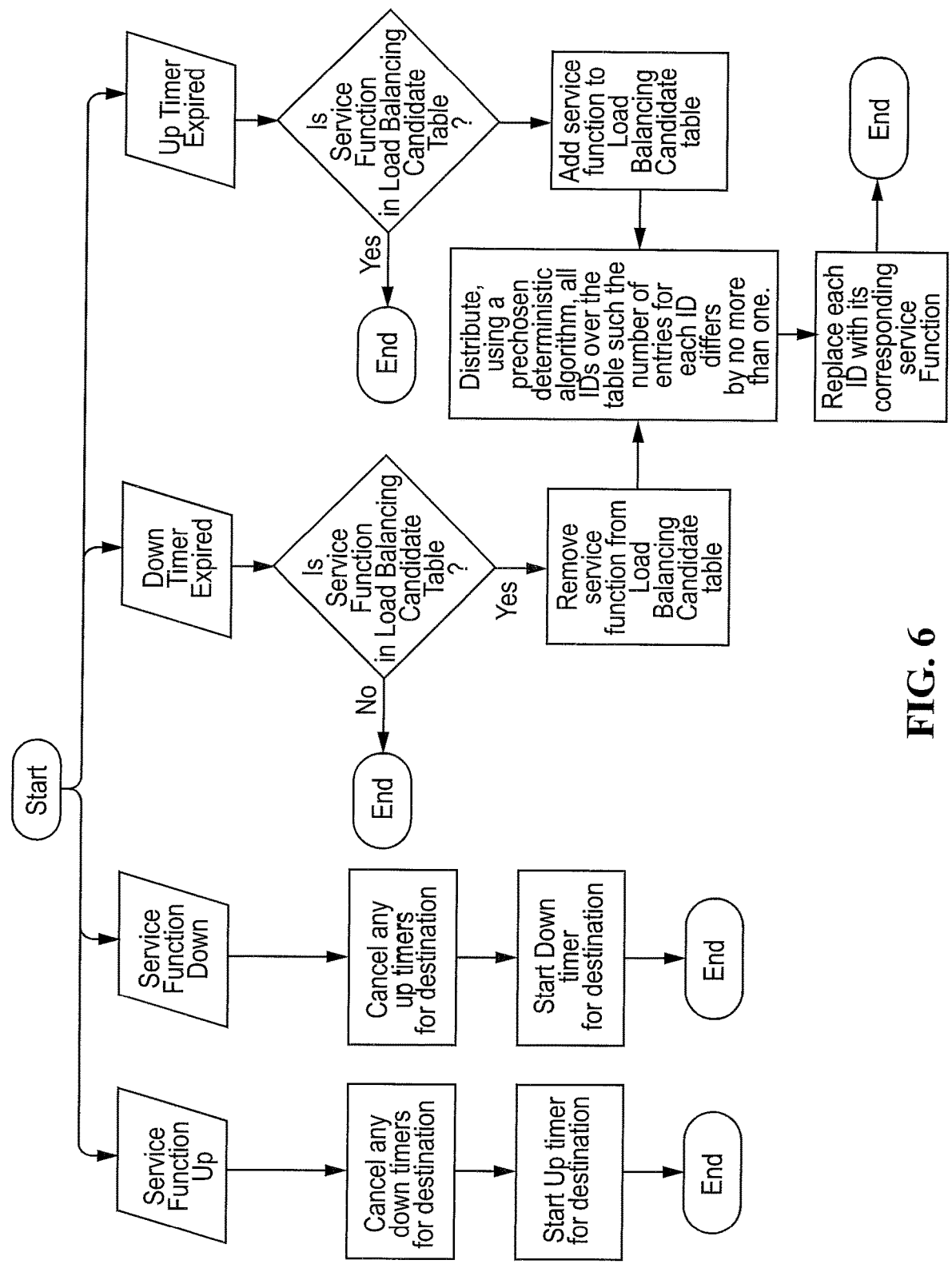
FIG. 6 is a flow chart for traffic rebalancing according to an embodiment.

The method for the automatic rebalancing system is shown in FIG. 6. The automatic rebalancing system is intended to be aware of the full set of possible service functions providing the same high level service, and maintains state as to which are up and which are down. It may also be responsible for programming the lookup table used by the load balancer fast-path. Under normal conditions, the rebalancing system is intended to be inactive. However, if a service function's state changes, it starts a timer based on whether the state changed to up, or whether it changed to down. It may also cancel a timer if another one was active.

When the timer fires, the automatic rebalancing system will redistribute the service functions over the load balancer fastpath table in order to try and ensure or determine whether the traffic is being evenly distributed amongst all available online devices.

In order to allow distributed scaling of the system, by simply adding new Traffic Steering Engines, the load balancer uses a deterministic hash to give each service functions a consistent identifier. Each Traffic Steering Engine may run the same method on the same set of devices, ensuring that the resulting load balancer table is the same on each Traffic Steering Engine. This behaviour is intended to ensure that a packet will be deterministically load-balanced to the same service function regardless of which Traffic Steering Engine handled the packet.

Figure 5:
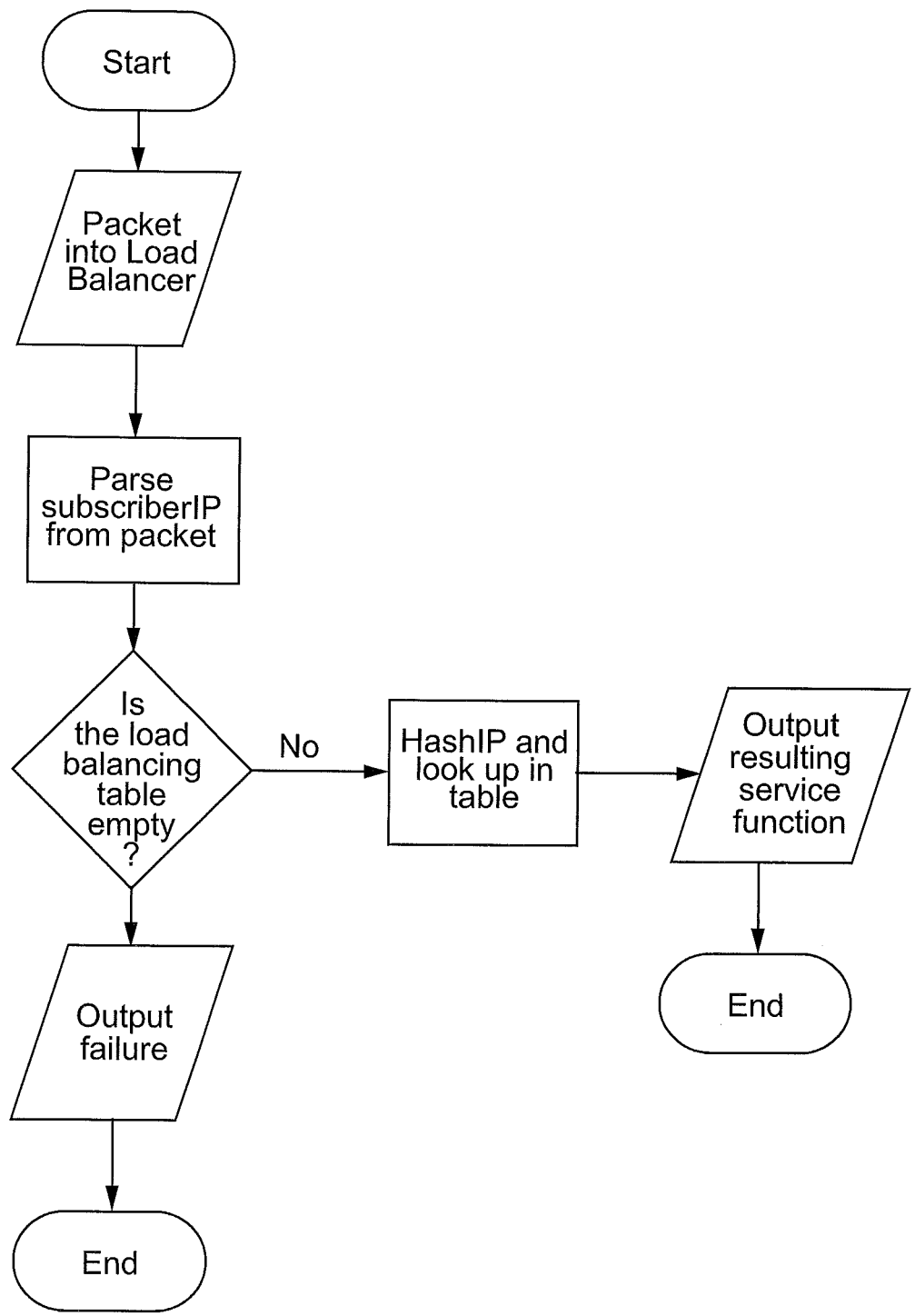
FIG. 5 is a flow chart for load balancing according to another embodiment.

In the fastpath as shown in FIG. 5, packets are mapped to a service function by parsing the subscriber IP from the packet, and using it to perform a look up. Traffic from the subscriber (also known as upstream traffic), will use the source IP of the packet. Traffic from the internet (also known as downstream traffic), will use the destination IP of the packet. The IP can be either IPv4 or IPv6.

The parser may skip past tunnels in order to find the subscriber IP. For example, if configured to, the parser may skip the outer IP of an L2TP tunnel in order to find the subscriber IP.

Once the IP has been parsed, it is hashed into a smaller value to use as an index in the lookup table programmed by the automatic rebalancing system. The hashing algorithm takes 12 contiguous bits of the IP to form a value between 0 and 4095.

If no service functions are up, the fastpath bypasses the lookup logic, returning a failure. Otherwise, it performs the lookup by directly indexing into its table of 4096 entries using a previously chosen key. The resulting service function is output, to be used by the Forwarder.

The Health Module (shown in FIG. 9) is responsible for issuing keep-alive packets to be sent from each forwarder to each service function. An operational status for each service function is determined by a scoring method that processes the results of a series of keep-alive transactions. A transaction is considered to be successful if a keep-alive response was received within a specified time period (such as, before the response timeout) otherwise is it deemed unsuccessful.

Figure 7:
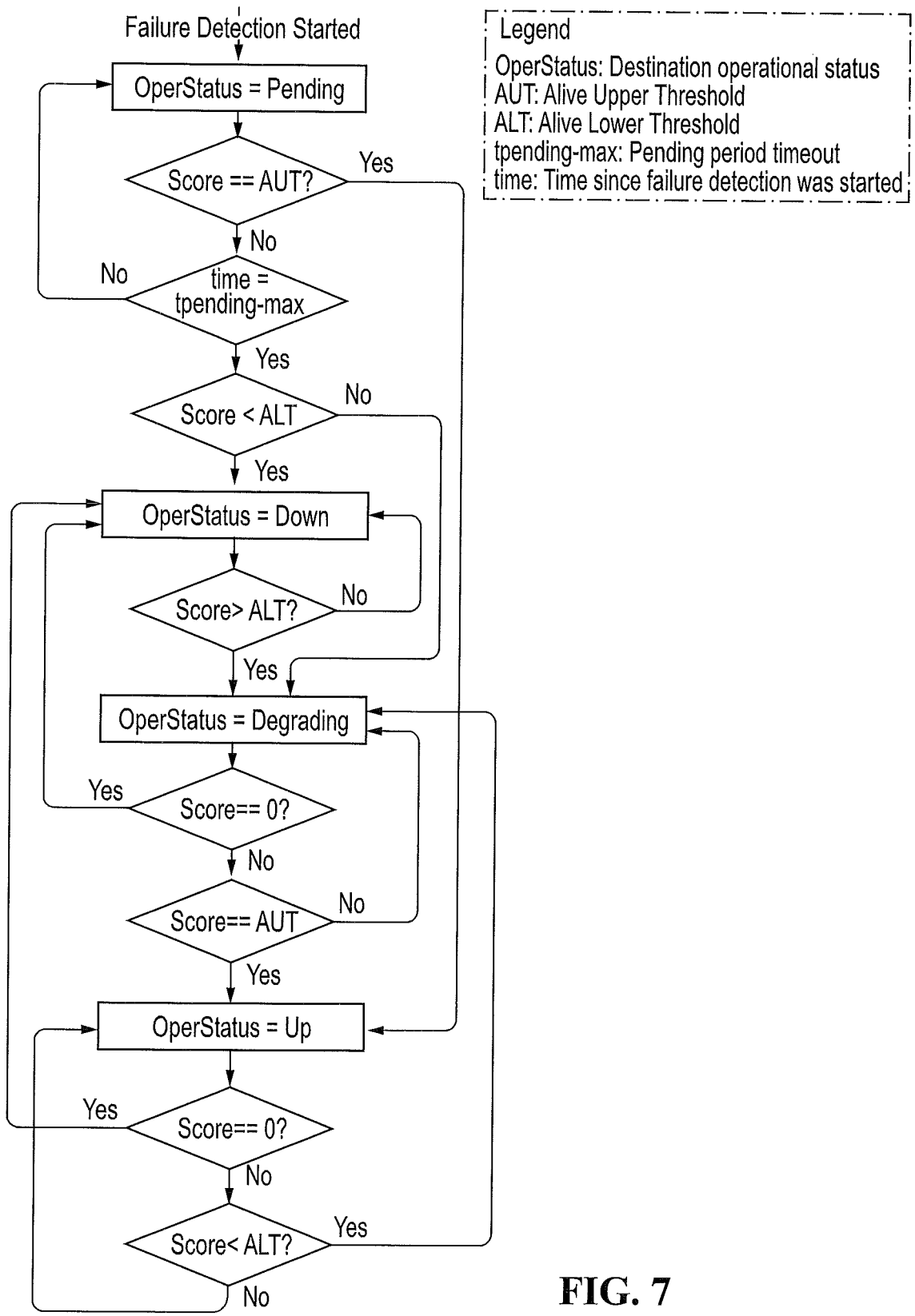
FIG. 7 is a flow chart a health scoring method according to an embodiment.

FIG. 7 illustrates the transitions between operational states of a service function, as reported by the scoring method.

The score is maintained as a bounded unsigned integer. It is recomputed along with the operational state when each transaction result event is processed. An event is defined as either the receipt of a keep-alive response or the timeout of a keep-alive request.

The scoring changes that can occur for a service function are +1 or −1, where a value of +1 is from a successful keep-alive event and a value of −1 is from an unsuccessful keep-alive event. The score is bounded between the limits of 0 and the alive upper threshold (AUT). Thus, a −1 scoring change when the score is 0 and a +1 scoring change when the score equals AUT will result in a clamping of the score value to 0 and AUT respectively.

The Alive upper threshold (AUT) is the scoring value that is to be met in order for the method to report that the service function is up. Only once the AUT has been met will the Alive lower threshold (ALT) be considered when computing the operational state.

At this point, as long as the score remains greater than or equal to the ALT, the operational state will remain as up. If the score drops below ALT, then the operational state will change to degraded. This hysteresis is built in to accommodate for intermittent blips of latency or a minor amount of transaction failures. In some cases, once the operational state changes to degraded, that the operational state will only return to up if the score value becomes equal to the AUT. Finally, a score of 0 indicates that the service function is in an operational state of down.

To reduce or prevent undesirable oscillation (flapping) between degraded and down, when the score reaches 0 and the service function enters the down state, the score must reach the ALT before it re-enter the degraded state. Therefore, in this example, the region between the ALT and 0 also serves as a hysteresis. It will be understood that the AUT and ALT may be predetermined and may be amended from time to time.

In an example, when keep-alive monitoring is first enabled for the service function, it enters the "pending" state. During the period of tpending-max (the pending period timeout), it is assumed that it is likely that the service function is still initializing and thus it serves as a grace period to filter out any states that would indicate that the service function is not up. If the score reaches a point where the service function can be reported as up during this period, then the service function will transition directly to up and break out of the pending period. This pending period is intended to contain enough transactions such that the service function is able to reach an operational state of up. Other methods to ensure that the startup time of a service function does not render the operational status of the service function as down may also be used.

The health module will broadcast changes in service function operational state for the purposes of configuring load balancer forwarding entries, and automatically adding or removing service functions from their forwarding paths according to respective health determination.

The threshold parameters used by the health module to create the filtering hysteresis (such as: AUT, ALT, pending period, or the like) are configurable in order to be more or less aggressive in concluding the operational state of a service function. It will be understood that various Network Operators may have different considerations for determining threshold parameters used.

Figure 8:
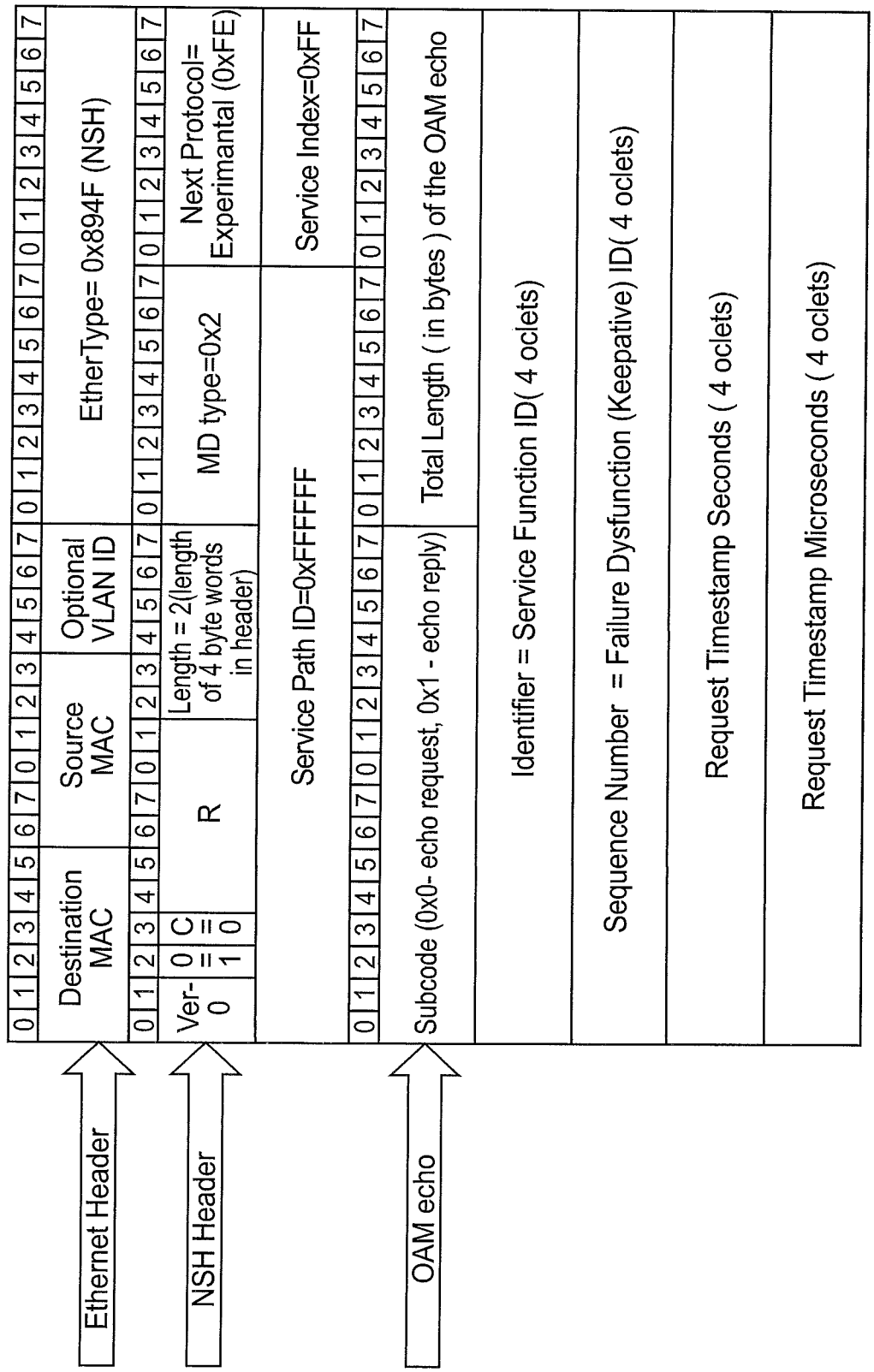
FIG. 8 illustrates an example OAM Echo packet format according to an embodiment.

FIG. 8 above describes the packet format that is used by both the forwarder (initiator) and the service function (responder) for a keep-alive transaction. It will be understood that other message formats or protocols would also suit the required purpose of Forwarders requesting Service Functions to respond if "up".

A request is constructed by the initiator by first crafting the inner portion (OAM echo) of the packet. It sets the initial direction and generates a unique destination and transaction ID pair used to identify a corresponding response that will later be received from the responder. The initiator can also inject a timestamp into the request that can be used for the purpose of latency measurements. An overall OAM echo length field is included for future provisions to include TLVs containing data such as service function load measurement metrics, path tracing information, and the like.

The OAM echo is encapsulated by NSH, with the OAM bit set to 1 and next protocol set to 0xFF to indicate that the inner packet data is OAM echo and must not be treated as data traffic. In some cases there may not be an IETF approved next protocol byte specifically for an OAM echo. As a result, the forwarder configuration allows for health monitoring to be disabled on a per-service function basis for compatibility purposes.

In this example, the outer encapsulation is Ethernet, where the destination MAC address corresponds to the MAC-NSH locator of the service function as provisioned in the forwarder, and the source MAC address corresponds to the interface used by the initiator to transmit the request.

Upon receipt of a request, the responder must detect the OAM echo request by inspecting the NSH encapsulation and detecting that the OAM bit is set, along with the next protocol set to 0xFF. From this point, the responder can simply transmit a copy of the original request back to the initiator with the set the subcode to reply.

One function of the service function is to return packets to the forwarder after processing. This requires having a network locator for one or more service functions. Although the required information may be configured, in an embodiment of the present system, the information may be learned when each packet is received at the service function, as follows:
 i. The source address of the packet is parsed. This source address may be an Ethernet address or an IP address, and may include higher-layer locator information, such as UDP port. Precisely which fields are used depends on the type of encapsulation used.
 ii. The path-next-hop parameters are parsed. These parameters may include a path identifier and service index.
 iii. The path-next-hop parameters are advanced to identify the next service function (for example, by decrementing the service index)
 iv. A path-forwarding table structure is indexed by the path-next-hop identifier(s), and may be created if necessary.
 v. The row is updated with the source address fields of the packet.

Thereafter, a packet may be sent to a path by retrieving the path-forwarding table row at the index of the path, and encapsulating the packet according to the information found in that row.

In some cases, each row in the path-forwarding table structure is preferably equipped with a last-updated time. This may be used so that unused rows may be aged and removed to free memory.

Note that as described, only one forwarder is learned per path identifier. However, multiple forwarders may be maintained per path, provided they time out independently.

Another function of the service function is to respond to health-check packets sent by the health module so that the forwarders continue to send traffic to the service function. Health-check packets are immediately returned from whence they came. In an alternative embodiment of the invention, the health-check packets contain fields allowing the service function to report load and utilization, permitting the load-balancer to select service functions on the basis of relative capacity.

Network communications generally require bidirectional traffic. In a service chaining deployment, the up-link traffic and down-link traffic are typically communicated using distinct path identifiers. If a function needs to correlate the two directions of traffic, the service function must link together the up-link and down-link path identifiers. A straightforward approach is to assign up-link and down-link path identifiers that have a reversible mathematical relationship to each other; then the up-link identifier can be calculated from the down-link identifier, and vice versa. Other approaches may also be used to associate or correlate the direction of the traffic A variety of capabilities may be provided by different classes of service functions. This system is intended to support a wide variety of capabilities that include, but are not limited to:
 i. Aggregate measurements about application usage
 ii. Quality-of-service indicators
 iii. Subscriber metering and quota
 iv. Attack detection
 v. Traffic shaping and reprioritization
 vi. Firewall polices The system may use developing IETF SFC standards, DPDK, network concepts, computing hardware, network interfaces, as well as operating systems and devices drivers to support the various methods detailed herein.

The disclosure differs from other conventional solutions as the system is intended to add automatic failure detection and correction (shunt or rebalancing) using data-plane mechanisms vs. requiring control-plane intervention. Further, the system includes automated health-checking and automated actions (for example: skip) upon failure.

The system is further intended to include the denormalizing configuration which is intended to produce efficient forwarding.

The system of the disclosure may be scaled up or down by adding or removing classifier, forwarding, or service function components. The health-checking and load-balancing components are intended to allow automatic reconfiguration of the system without central orchestration or control.

Whether system changes are intentional or due to failures, the system is intended to be robust and automatically reconfigured in order to adjust to the changes and/or failures.

The design of the system and methods allow for implementation on general-purpose computing hardware, including virtual machines.

Figure 9:
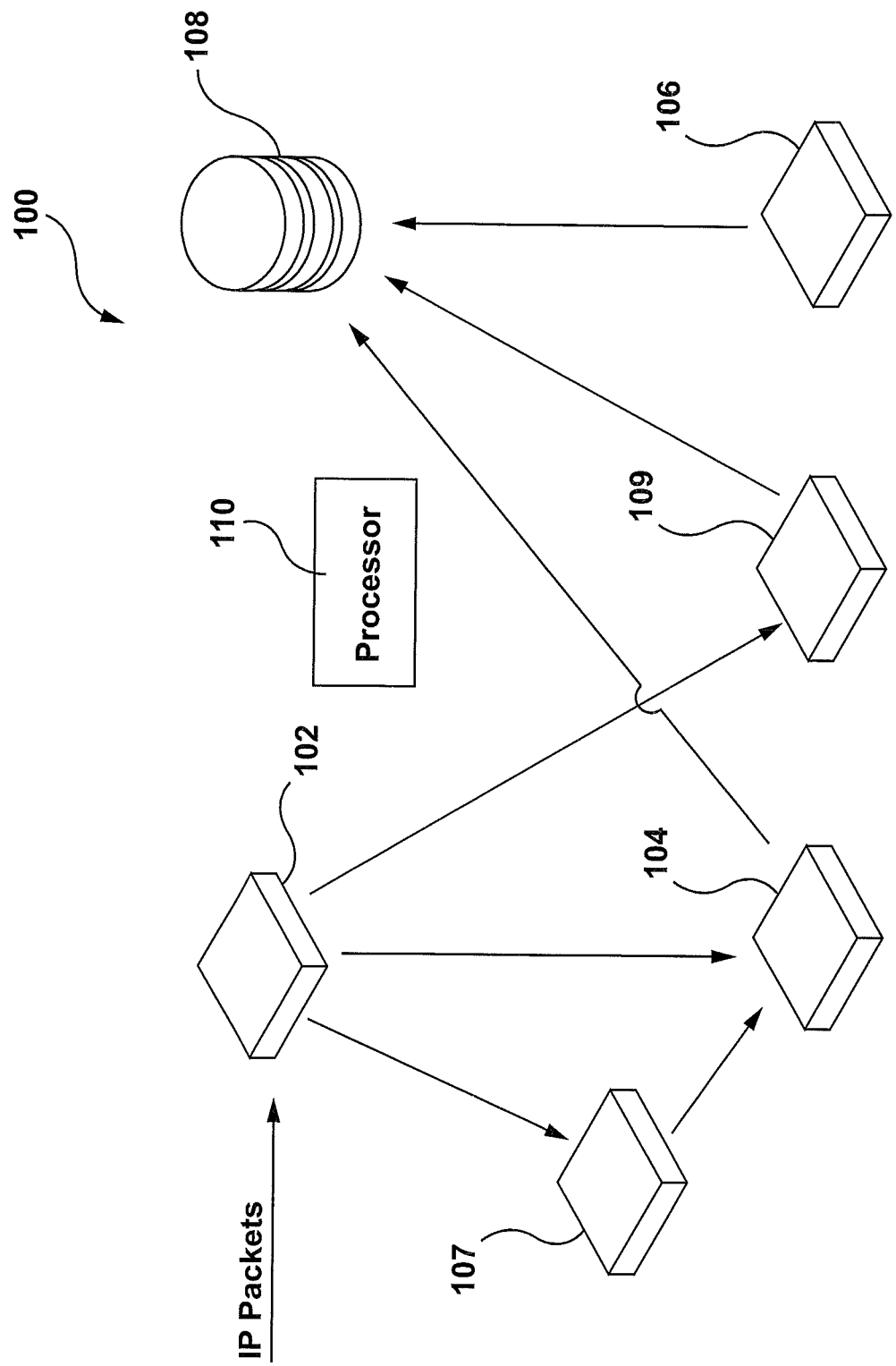
FIG. 9 illustrates a system for traffic steering and traffic analysis according to another embodiment.

Turning to FIG. 9, a schematic diagram of a system for traffic steering and/or traffic analysis is shown. The system 100 includes various modules or engines. For instance, in this embodiment, the system includes classifier 102, a forwarder 104, a load balancer module or engine 106 and an automatic rebalancing system or engine 109. The system may further include a health module 107. As shown, the arrows are shown as examples of how the transmission of packets and information may be performed, however, not all arrows are included and other communication (not reflected by the arrows) between the modules may be possible.

The system 100 may further include a memory component 108, which may be included in as part of the system or may be accessible by the modules of the system 100.

Although described as separate modules herein, it will be understood that the modules of the system 100 may be integrated and combined in various ways or may be stand-alone modules.

The system 100 further includes a processor 110. The processor 110 may be in a control system module and configured to execute instructions from the other modules of the system 100. Alternatively, the processor 110 may be a standalone component. In some cases, the processor may be a central processing unit. In other cases, each module may include or be operatively connected to a separate processor.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A system for steering network traffic to service functions in a service function chain, the system comprising:
    a processor;
    a data storage module;
    an input interface;
    an output interface;
    an automatic rebalancing system configured to maintain an operating status associated with each service function, wherein the operating status is determined by a health module;
    the health module configured to issue a series of health check packets to determine the operating status of at least one service function based on responses of the series of health check packets, and wherein the operating status is updated after a predetermined threshold is met based on the responses from the series of health check packets;
    a classifier configured to determine a path for a data packet in the service function chain, wherein the path is determined based on the input interface and at least one rule associated with the classifier; and
    a forwarder configured to determine a next location to which the data packet will be sent based on the path, and to send the health check packets issued by the health module; and
    wherein the automatic rebalancing system is configured to distribute the data packet over the service functions based on a change in the operating status of at least one service function.

2. A system according to claim 1, further comprising a load balancer configured to co-operate with the forwarder to distribute the data packet to a selected service function module when there are more than one of that service function module.

3. A system according to claim 1, wherein the system is configured such that each path terminates by sending traffic out the output interface associated with the input interface.

4. A system according to claim 1, wherein each input interface maps the data packet to at least one classifier rule.

5. A system according to claim 1, wherein if the data packet cannot be mapped to the at least one classifier rule, the data packet is sent to the output interface associated with the input interface.

6. A system according to claim 1, further comprising a plurality of service function modules wherein each service function module is configured to return the data packet to the forwarder from which it is received.

7. A system according to claim 1, wherein the health-check packets include fields to report load and utilization at the at least one service function.

8. A system according to claim 1, wherein the operating state of a service function is not considered operational until the health module has received a plurality of successful responses.

9. The system of claim 1 wherein if the forwarder determines that at least one service function is not operational, the forward treats the data packet as processed and skips the at least one service function;
    otherwise the forwarder determines the path to include the at least one service function.

10. The system of claim 1, wherein the data packet is mapped to a service function by parsing a subscriber IP from the packet, determining the path based on the subscriber IP.

11. The system of claim 1, wherein the operating status of at least one service function is considered to be pending during a predetermined period while the service function is initializing.

12. A method for steering network traffic to service functions in a service function chain, the method comprising:
    maintaining an operating status of each of the service functions in a service function chain at an automatic rebalancing system;
    issuing a series of health check packets at a health module, to determine the operating status of at least one service function in the service chain, wherein the operating status of the at least one service function is determined based on responses of the series of health check packets wherein the operational status is updated after a predetermined threshold is met based on the responses from the series of health check packets;
    classifying, via a classifier, a data packet to determine a path for a data packet in the service function chain, wherein the path is determined based on the input interface and at least one rule associated with the classifier;
    forwarding, via a forwarder, the data packet to a next location to which the data packet will be sent based on the path; and
    distributing, via the automatic rebalancing system, the data packet over the service functions, based on a change in the operating statues of at least on service function.

13. A method according to claim 12, further comprising load balancing the service functions.

14. A method according to claim 12, wherein, if the data packet cannot be classified, the data packet is sent to an output interface associated with an input interface.

15. A method according to claim 12, wherein determining the operating status further comprises determining a load and utilization of the at least one service function.

16. A method according to claim 12, wherein if the operating status of the at least one service function is down, directing the data packet to an equivalent service function with an operating status of up.

17. A system for steering network traffic to service functions in a service function chain, the system comprising:
- a processor configured to execute stored machine readable instruction;
- a data storage module configured to store data related to a data packet;
- an input interface configured to receive a data packet from a network;
- a classifier configured to receive the packet from the input interface and determine a path comprising at least one function for the data packet, wherein the function is performed by at least one of a plurality of service functions within the service function chain, and wherein the path is further determined based on the input interface and at least one rule associated with the classifier;
- a forwarder configured to determine the next function to which the data packet will be sent based on the path;
- a load balancer configured to determine which service function will perform the next function to the data packet based at least in part on the load of each of the plurality of service functions within the service function chain;
- a health module configured to issue a series of health check packets and to determine an operational status of each of the plurality of service functions within the service function chain based on responses of the series of health check packets and wherein the operational status is updated after a predetermined threshold is met based on the responses from the series of health check packets;
- an automatic rebalancing system configured to store an operating status of each of the service functions within the service function chain and distribute the data packet over the service functions, based on a change in the operating status of at least one service function; and
- an output interface configured to direct the data packet to a service function based on the load and the operational status of each of the plurality of service functions within the service function chain.

* * * * *